US010146300B2

(12) United States Patent
McLean

(10) Patent No.: US 10,146,300 B2
(45) Date of Patent: Dec. 4, 2018

(54) EMITTING A VISUAL INDICATOR FROM THE POSITION OF AN OBJECT IN A SIMULATED REALITY EMULATION

(71) Applicant: LENOVO Enterprise Solutions (Singapore) PTE. LTD., New Tech Park (SG)

(72) Inventor: James Gordon McLean, Raleigh, NC (US)

(73) Assignee: LENOVO Enterprise Solutions (Singapore) PTE. LTD., New Tech Park ( * ) Notice: Subject to any disclaimer, the term of this patent is extended or adjusted under 35 U.S.C. 154(b) by 0 days.

(21) Appl. No.: 15/415,433

(22) Filed: Jan. 25, 2017

(65) Prior Publication Data
US 2018/0210542 A1    Jul. 26, 2018

(51) Int. Cl.
| | |
|---|---|
| *G06T 19/00* | (2011.01) |
| *A63F 13/537* | (2014.01) |
| *G06T 11/60* | (2006.01) |
| *G06F 3/01* | (2006.01) |
| *G06T 7/73* | (2017.01) |

(Continued)

(52) U.S. Cl.
CPC ............ *G06F 3/011* (2013.01); *A63F 13/525* (2014.09); *A63F 13/537* (2014.09); *G06T 7/20* (2013.01); *G06T 7/60* (2013.01); *G06T 7/73* (2017.01); *G06T 19/006* (2013.01); *A63F 2300/8082* (2013.01); *G06T 2207/30244* (2013.01); *G06T 2215/16* (2013.01)

(58) Field of Classification Search
CPC ..... G01S 7/24; G01S 7/41; G01S 1/00; G02B 27/0172; G02B 23/125; G02B 27/0189; G06T 7/73; G06T 7/20; G06T 7/60; G06T 19/006; G06T 11/60; G06T 2207/30244; G06T 2215/16; G06F 3/011; A63F 13/525; A63F 13/537
USPC ........................ 345/7, 8, 629–635; 463/1–69
See application file for complete search history.

(56) References Cited

U.S. PATENT DOCUMENTS

| | | | |
|---|---|---|---|
| 5,659,691 A | * | 8/1997 | Durward ................. A63F 13/12 707/999.104 |
| 6,166,744 A | | 12/2000 | Jaszlics |

(Continued)

OTHER PUBLICATIONS

Tapia Lokki, et al., A Case Study of Auditory Navigation in Virtual Acoustic Environments, Telecommunications Software and Multimedia Laboratory, Helsinki University of Technology.

(Continued)

*Primary Examiner* — Chante Harrison
(74) *Attorney, Agent, or Firm* — Kunzler, PC; Jason Friday

(57) ABSTRACT

An apparatus for virtual reality object position includes a processor and memory that stores executable code to determine a position of an object in a simulated reality ("SR") emulation with respect to a position of a user. The SR emulation is viewable by the user with an SR viewer. The SR viewer has a limited field of view. The code is executable to determine a position of the field of view of the SR viewer with respect to the object, and to emit a visual indicator from a direction of the object and in a direction of the user. The visual indicator is visible in the field of view of the SR viewer, and the visual indicator within the field of view includes an indication of the position of the object with respect to the user.

17 Claims, 7 Drawing Sheets

(51) Int. Cl.
  *G06T 7/60*     (2017.01)
  *G06T 7/20*     (2017.01)
  *A63F 13/525*   (2014.01)

(56) References Cited

U.S. PATENT DOCUMENTS

| | | | |
|---|---|---|---|
| 6,417,969 | B1 | 7/2002 | DeLuca |
| 6,537,153 | B2* | 3/2003 | Boku .................... A63F 13/10 463/1 |
| 6,559,813 | B1 | 5/2003 | DeLuca |
| 6,854,012 | B1* | 2/2005 | Taylor .................... H04L 41/22 709/224 |
| 7,639,208 | B1 | 12/2009 | Ha |
| 8,279,168 | B2 | 10/2012 | Glomski |
| 8,990,682 | B1 | 3/2015 | Wong |
| 9,110,564 | B2 | 8/2015 | Hwang |
| 9,147,111 | B2 | 9/2015 | Fleck |
| 9,645,394 | B2 | 5/2017 | Kinnebrew |
| 2003/0219146 | A1 | 11/2003 | Jepson |
| 2004/0109009 | A1 | 6/2004 | Yonezawa |
| 2004/0157662 | A1* | 8/2004 | Tsuchiya ................. A63F 13/10 463/32 |
| 2008/0316863 | A1* | 12/2008 | Walley ................... A63F 13/235 3/235 |
| 2009/0066690 | A1 | 3/2009 | Harrison |
| 2010/0156941 | A1* | 6/2010 | Seung .................. G06F 3/04847 345/660 |
| 2010/0208057 | A1 | 8/2010 | Meier |
| 2011/0037712 | A1* | 2/2011 | Kim .................... H04M 1/7253 345/173 |
| 2011/0205242 | A1 | 8/2011 | Friesen |
| 2012/0019858 | A1* | 1/2012 | Sato .................... H04N 1/00344 358/1.15 |
| 2012/0206452 | A1 | 8/2012 | Geisner |
| 2013/0031511 | A1 | 1/2013 | Adachi |
| 2013/0044128 | A1 | 2/2013 | Liu |
| 2013/0093788 | A1 | 4/2013 | Liu |
| 2013/0141421 | A1 | 6/2013 | Mount |
| 2013/0193645 | A1* | 8/2013 | Kazakov .................... F41J 5/06 273/372 |
| 2013/0208014 | A1 | 8/2013 | Fleck |
| 2013/0215230 | A1 | 8/2013 | Miesnieks |
| 2013/0285885 | A1* | 10/2013 | Nowatzyk ............... G02B 3/0006 345/8 |
| 2013/0326364 | A1 | 12/2013 | Latta |
| 2014/0049620 | A1 | 2/2014 | Sun et al. |
| 2014/0078175 | A1 | 3/2014 | Forutanpour |
| 2014/0132629 | A1 | 5/2014 | Pandey |
| 2014/0192164 | A1 | 7/2014 | Tenn |
| 2014/0267792 | A1 | 9/2014 | Mullins |
| 2015/0038203 | A1* | 2/2015 | Cho ...................... A63F 13/537 3/537 |
| 2015/0062120 | A1 | 3/2015 | Reisner-Kollmann |
| 2015/0077592 | A1 | 3/2015 | Fahey |
| 2015/0091943 | A1 | 4/2015 | Lee |
| 2015/0130790 | A1 | 5/2015 | Vasquez |
| 2015/0243079 | A1 | 8/2015 | Cho |
| 2015/0279103 | A1 | 10/2015 | Naegle |
| 2015/0302867 | A1 | 10/2015 | Tomlin |
| 2015/0302869 | A1 | 10/2015 | Tomlin |
| 2015/0332505 | A1 | 11/2015 | Wang |
| 2015/0363978 | A1 | 12/2015 | Maimone |
| 2015/0371444 | A1 | 12/2015 | Hara |
| 2016/0005233 | A1* | 1/2016 | Fraccaroli .......... G02B 27/0172 345/633 |
| 2016/0025982 | A1 | 1/2016 | Sutherland |
| 2016/0027215 | A1 | 1/2016 | Burns |
| 2016/0055676 | A1* | 2/2016 | Kasahara ............. G06T 19/006 345/633 |
| 2016/0080732 | A1 | 3/2016 | Pedley |
| 2016/0121211 | A1* | 5/2016 | Ladd .................... A63F 13/355 3/355 |
| 2016/0148433 | A1 | 5/2016 | Petrovskaya |
| 2016/0155273 | A1* | 6/2016 | Lyren .................. G02B 27/017 345/633 |
| 2016/0163107 | A1 | 6/2016 | Chen |
| 2016/0196692 | A1 | 7/2016 | Kjallstrom |
| 2016/0225187 | A1 | 8/2016 | Knipp |
| 2016/0247319 | A1 | 8/2016 | Nowatzyk |
| 2016/0260251 | A1 | 9/2016 | Stafford |
| 2016/0266386 | A1 | 9/2016 | Scott |
| 2016/0275915 | A1 | 9/2016 | Smyth |
| 2016/0371888 | A1 | 12/2016 | Wright |
| 2017/0061691 | A1 | 3/2017 | Scott |
| 2017/0061692 | A1 | 3/2017 | Giraldi et al. |
| 2017/0061702 | A1 | 3/2017 | Christen |
| 2017/0120148 | A1 | 5/2017 | Yim |
| 2017/0358131 | A1* | 12/2017 | Weiss .................... G06F 3/0416 |
| 2018/0025502 | A1* | 1/2018 | Menozzi ............... G06T 19/006 345/633 |

OTHER PUBLICATIONS

Tapia Lokki, et al., Navigation with Auditory Cues in a Virtual Environment, IEEE MultiMedia 2005.

Piekarski et al., Augmented Reality User Interfaces and Techniques for Outdoor Modeling, Wearable Computer Laboratory, School of Computer and Information Science, University of South Australia, Mawson Lakes, SA, Apr. 28-30, 2003.

U.S. Appl. No. 14/993,698, filed Jan. 12, 2016, Notice of Allowance dated May 22, 2017.

Reddit PlanetSide 2, Option to disable the "Mission Objectives"?, 2016 Reddit Inc. https://www.reddit.com/r/Planetside/comments/25owyv/option_to_disable_the_mission_objectives/, Last visited Nov. 10, 2016.

Reddit PlanetSide 2, Toggles for HUD elements, 2016 Reddit Inc. https://www.reddit.com/r/Planetside/comments/2jxzmytoggles_for hud_elements/, Last visited Nov. 10, 2016.

U.S. Appl. No. 14/993,698, filed Jan. 12, 2016, Office Action dated Oct. 27, 2016.

\* cited by examiner

EMITTING A VISUAL INDICATOR FROM THE POSITION OF AN OBJECT IN A SIMULATED REALITY EMULATION

BACKGROUND

Description of the Related Art

Virtual reality ("VR"), augmented reality ("AR"), and mixed reality ("MR") are fast growing fields that allow users to become immersed in a VR/AR/MR emulation that mimic real-life situations, such as simulators, nature tours, as well as other situations, such as fantasy experiences, etc. VR emulation provides an immersive, 360-degree, three-dimensional field in which users can interact. AR and MR emulation combine actual surroundings with simulations where the users can react and interact. However, the field of view of the user is typically limited, particularly where headsets are used. Therefore, objects that are added to the environment, or that require the user's attention, may be placed outside this field of view. Either the user must continually scan around the VR/AR/MR environment for new content, or the new content must be contrived to appear in the user's field of view. Similarly, if an object changes state or visually indicates that it requires attention, that change may not be visible to the user.

BRIEF SUMMARY

An apparatus for simulated reality object location is disclosed. A method and system also perform the functions of the apparatus. An apparatus includes a processor and a memory that stores code executable by the processor to determine a position of an object in a simulated reality ("SR") emulation with respect to a position of a user. The SR emulation is viewable by the user with an SR viewer. The SR viewer has a limited field of view of the SR emulation. The code is executable by the processor to determine a position of the field of view of the SR viewer with respect to the object, and to emit a visual indicator from a direction of the object and in a direction of the user. The visual indicator is visible in the field of view of the SR viewer, and the visual indicator within the field of view includes an indication of the position of the object with respect to the user.

A method for SR object location includes determining a position of an object in an SR emulation with respect to a position of a user. The SR emulation is viewable by a user with an SR viewer, and the SR viewer has a limited field of view of the SR emulation. The method includes determining a position of the field of view of the SR viewer with respect to the object, and emitting a visual indicator from a direction of the object and in a direction of the user. The visual indicator is visible in the field of view of the SR viewer, and the visual indicator within the field of view includes an indication of the position of the object with respect to the user.

A system comprising for SR object location includes an SR viewer for viewing an SR emulation, and a computing device coupled to the SR viewer. The computing device includes memory that stores code executable by a processor of the computing device to determine a position of an object in an SR emulation with respect to a position of a user, where the SR viewer has a limited field of view of the SR emulation, to determine a position of the field of view of the SR viewer with respect to the object, and to emit a visual indicator from a direction of the object and in a direction of the user in response to determining that the object is not in the field of view of the SR viewer. The visual indicator is visible in the field of view of the SR viewer, and the visual indicator within the field of view includes an indication of the position of the object with respect to the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
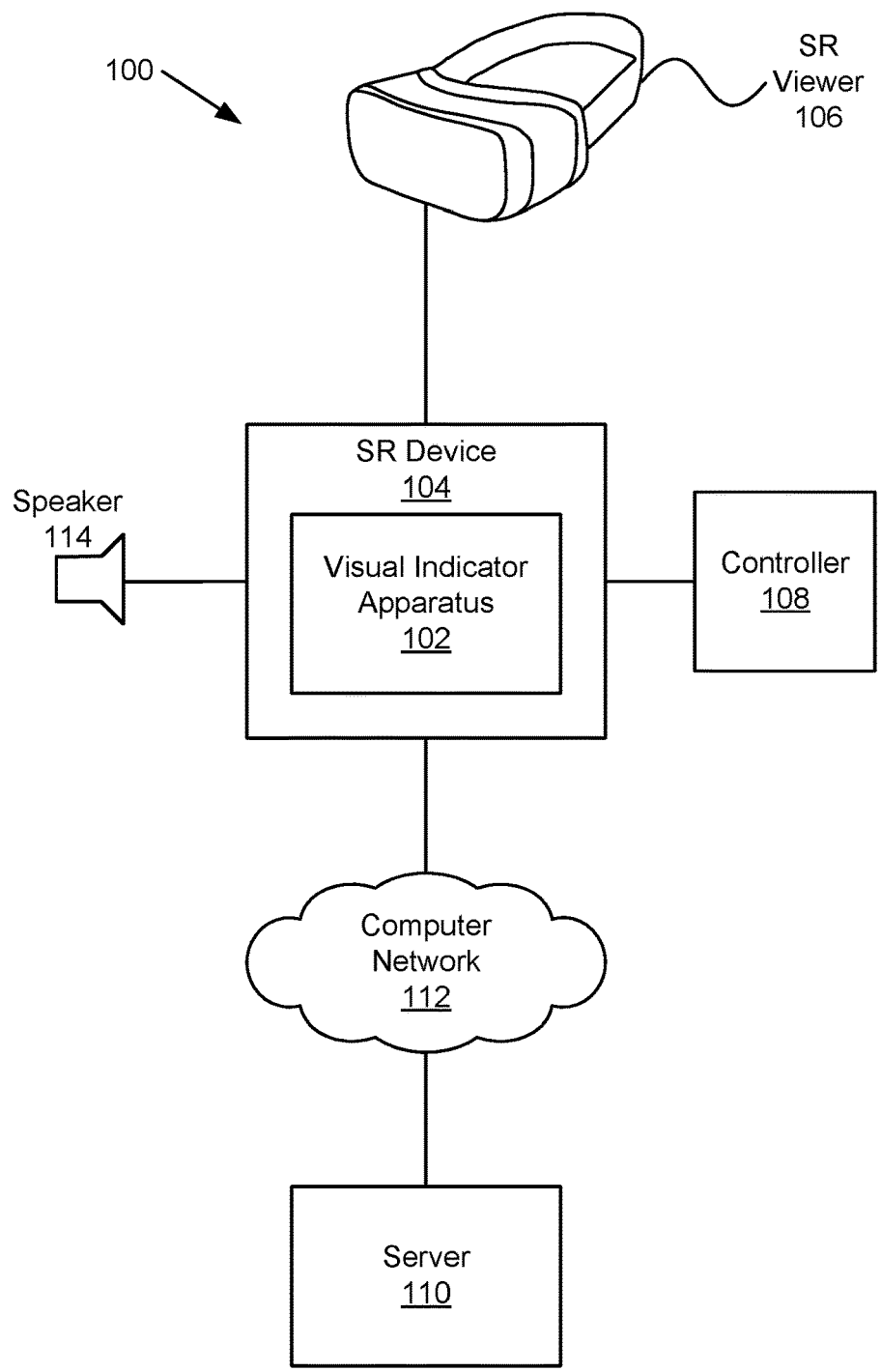
FIG. 1 is a schematic block diagram illustrating one embodiment of a system for simulated reality ("SR") object location.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The computer readable storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for virtual reality object location is disclosed. A method and system also perform the functions of the apparatus. An apparatus includes a processor and a memory that stores code executable by the processor to determine a position of an object in a simulated reality ("SR") emulation with respect to a position of a user. Simulated reality includes virtual reality ("VR"), augmented reality ("AR"), mixed reality ("MR") and other immersive technologies where a user views and interacts with simulated objects, and in some cases, actual objects. The SR emulation is viewable by the user with an SR viewer. The SR viewer has a limited field of view of the SR emulation. The code is executable by the processor to determine a position of the field of view of the SR viewer with respect to the object, and to emit a visual indicator from a direction of the object and in a direction of the user. The visual indicator is visible in the field of view of the SR viewer, and the visual indicator within the field of view includes an indication of the position of the object with respect to the user.

In one embodiment, the visual indicator includes a simulated waveform that moves from the position of the object through the field of view. The waveform provides an indication of a distance between the object and the user and/or a relative position with respect to the field of view of the SR viewer. In another embodiment, the waveform includes at least a portion of one or more spherical wavefronts visible in the field of view wherein a center of the spherical wavefronts includes the position of the object with respect to the position of the user. In another embodiment, the waveform includes at least a portion of two or more spherical wavefronts visible in the field of view where a space between wavefronts relates to the distance between the object and the user. In another embodiment, the waveform includes at least a portion of one or more spherical wavefronts visible in the field of view where a thickness of a wavefront relates to the distance between the object and the user. In another embodiment, the waveform includes at least a portion of one or more spherical wavefronts visible in the field of view where an intensity of a wavefront relates to the distance between the object and the user.

In one embodiment, each visual indicator includes a distortion of the field of view of the SR viewer. In another embodiment, each visual indicator includes a change in visibility in the field of view of the SR emulation. In another embodiment, each visual indicator includes a color change of the field of view of the SR viewer. In another embodiment, the memory includes code executable by the processor to detect movement of one or more of the object and the user with respect to the SR emulation, and/or movement of the field of view of the SR viewer, and to emit one or more additional visual indicators. Each additional visual indicator is based on a current position of the object with respect to a current position of the user in the SR emulation at a time when the visual indicator is emitted, and/or a current position of the field of view in the SR emulation with respect to the object at the time when the visual indicator reaches the field of view.

In one embodiment, the memory includes code executable by the processor to stop emitting visual indicators in response to the object being in the field of view of the SR viewer. In another embodiment, the memory includes code executable by the processor to emit a sound indicator, where each sound indicator is synchronized to a visual indicator. Each sound indicator simulates being emitted from the position of the object. In another embodiment, the SR emulation includes a game and the memory includes code executable by the processor to emit the visual indicator as a reward in the game. In another embodiment, the memory includes code executable by the processor to freeze a position of a visual indicator in response to movement of the user. In another embodiment, the memory includes code executable by the processor to receive input from the user, where the input controls emission of the visual indicator. In another embodiment, the simulated reality emulation is a virtual reality ("VR") emulation, where the VR emulation is viewable by the user with a VR viewer, and the VR viewer has a limited field of view of the VR emulation.

A method for SR object location includes determining a position of an object in an SR emulation with respect to a position of a user. The SR emulation is viewable by a user with an SR viewer, and the SR viewer has a limited field of view of the SR emulation. The method includes determining a position of the field of view of the SR viewer with respect to the object, and emitting a visual indicator from a direction of the object and in a direction of the user. The visual indicator is visible in the field of view of the SR viewer, and the visual indicator within the field of view includes an indication of the position of the object with respect to the user.

In one embodiment, the visual indicator includes a simulated waveform that moves from the position of the object through the field of view. The waveform provides an indication of a distance between the object and the user and/or an angle relative to a center of the field of view of the SR viewer. In another embodiment, the waveform includes at least a portion of one or more spherical wavefronts visible in the field of view where a center of the spherical wavefronts includes the position of the object with respect to the position of the user. In another embodiment, the waveform includes at least a portion of two or more spherical wavefronts visible in the field of view where a space between wavefronts relates to the distance between the object and the user. In another embodiment, the waveform includes at least a portion of one or more spherical wavefronts visible in the field of view where a thickness of a wavefront relates to the distance between the object and the user. In another embodiment, the waveform includes at least a portion of one or more spherical wavefronts visible in the field of view where an intensity of a wavefront relates to the distance between the object and the user.

In one embodiment, each waveform includes a distortion of the field of view of the SR viewer, a change in visibility in the field of view of the SR emulation, and/or a color change of the field of view of the SR viewer. In another embodiment, the method includes detecting movement of one or more of the object and the user with respect to the SR emulation and/or movement the field of view of the SR viewer, and the method includes emitting one or more additional visual indicators where each additional visual indicator is based on a current position of the object with respect to a current position of the user in the SR emulation at a time when the visual indicator is emitted, and/or a current position of the field of view of the SR emulation with respect to the object at the time when the visual indicator reaches the field of view.

A system comprising for SR object location includes an SR viewer for viewing an SR emulation, and a computing device coupled to the SR viewer. The computing device includes memory that stores code executable by a processor of the computing device to determine a position of an object in an SR emulation with respect to a position of a user, where the SR viewer has a limited field of view of the SR emulation, to determine a position of the field of view of the SR viewer with respect to the object, and to emit a visual indicator from a direction of the object and in a direction of the user. The visual indicator is visible in the field of view of the SR viewer, and the visual indicator within the field of view includes an indication of the position of the object with respect to the user.

In one embodiment, the visual indicator includes a simulated waveform that moves from the position of the object through the field of view. The waveform provides an indication of a distance between the object and the user and/or an angle relative to a center of the field of view of the SR viewer.

FIG. 1 is a schematic block diagram illustrating one embodiment of a system 100 for simulated reality ("SR") object location. The system 100 includes one embodiment of a visual indicator apparatus 102 in an SR device 104, an SR viewer 106, a controller 108, a server 110, a computer network 112 and a speaker 114, which are described below.

Simulated reality includes virtual reality ("VR"), augmented reality ("AR"), mixed reality ("MR") and other immersive technologies where a user views and interacts with simulated objects, and in some cases, actual objects. Virtual reality emulation typically includes a virtual environment viewed by a user where the user can interact with the VR environment. Typically, virtual reality is a computer-generated simulation of a three-dimensional image or environment that can be interacted with in a seemingly real or physical way by a person using special electronic equipment, such as a VR viewer 106 with a screen inside.

Augmented reality is a live direct or indirect view of a physical, real-world environment where elements are augmented by computer-generated input such as objects, sound, graphics, and the like. Augmented reality is a subset of a more general mediated reality and simulated reality includes mediated reality. Mixed reality, which may also be referred to as hybrid reality, includes merging of real and virtual environments to produce new environments where physical and digital objects coexist and interact in real time. As used herein, simulated reality includes virtual reality, augmented reality, mediated reality, mixed reality, hybrid reality and other immersive technologies where a user has a limited field of view through an SR viewer such that objects may be out of the field of view of the user, a visual indicator is visible in the field of view of the SR viewer, and the visual indicator within the field of view includes an indication of the position of the object with respect to the user.

The visual indicator apparatus 102 helps a user viewing an SR emulation through an SR viewer 106 identify an object that is not in the field of view of the SR viewer 106. The visual indicator apparatus 102 determines the position of the object in the SR emulation with respect to a position of the user and determines a position of the field of view of the SR viewer 106 with respect to the object and then emits a visual indicator from a current position of the object that is visible or becomes visible in the field of view of the SR viewer 106. The visual indicator helps the user determine a position of the object with respect to the user. The visual indicator apparatus 102 is described in more detail with respect to the apparatuses 200, 300 of FIGS. 2 and 3.

The system 100 includes an SR device 104. The SR device 104, in one embodiment, includes the visual indicator apparatus 102. In other embodiments, all or part of the visual indicator apparatus 102 is located elsewhere, such as in the server 110. In one embodiment, the SR device 104 is part of the SR viewer 106. In the embodiment, all or part of the visual indicator apparatus 102 may also be part of the SR viewer 106. The SR device 104 is connected to the SR viewer 106 over a wireless or wired connection either directly or over a computer network, such as the computer network 112 of the system 100 described herein. The SR device 104 may also be connected to a controller 108 and/or speaker 114 through a wired or wireless connection. The SR device 104 may also be connected to the server 110 through the computer network 112 through a wired or wireless connection.

The wireless connection(s) may be a mobile telephone network. The wireless connection(s) may also employ a Wi-Fi network based on any one of the Institute of Electrical and Electronics Engineers ("IEEE") 802.11 standards. Alternatively, the wireless connection(s) may be a BLUETOOTH® connection. In addition, the wireless connection(s) may employ a Radio Frequency Identification ("RFID") communication including RFID standards established by the International Organization for Standardization ("ISO"), the International Electrotechnical Commission ("IEC"), the American Society for Testing and Materials ("ASTM"), the DASH7 Alliance, and EPCGlobal.

Alternatively, the wireless connection(s) may employ a ZigBee connection based on the IEEE 802 standard. In one embodiment, the wireless connection(s) employs a Z-Wave connection as designed by Sigma Designs. Alternatively, the wireless connection(s) may employ an ANT and/or ANT+ connection as defined by Dynastream Innovations Inc. of Cochrane, Canada.

The wireless connection(s) may be an infrared connection including connections conforming at least to the Infrared Physical Layer Specification ("IrPHY") as defined by the Infrared Data Association ("IrDA"). Alternatively, the wireless connection(s) may be a cellular telephone network communication. All standards and/or connection types include the latest version and revision of the standard and/or connection type as of the filing date of this application.

The SR device 104, in one embodiment, includes one or more processors, where a processor may be a central processing unit ("CPU"), a multicore processor, and the like, and the SR device 104 may include memory, data storage, a graphics processor, busses, and other typical computer processing components. The SR device 104 may be a game controller, a desktop computer, a laptop computer, a tablet computer, and the like. The SR device 104 may communicate with other SR devices (not shown), for example over the computer network 112, through the server 110, etc. For example, the SR emulation in the form of a VR emulation may include a multiplayer game and other players may interface with the SR device 104 over the Internet or other computer network 112. In another example, the SR device 104 accommodates multiple users and each user has an SR viewer 106 and/or controller 108 connected to the SR device 104. One of skill in the art will recognize other functions and configurations of an SR device 104.

The system 100 includes an SR viewer 106 that displays to the user an SR emulation. The SR emulation includes a visual environment within the field of view of the SR viewer 106 where the user may rotate the SR viewer 106 so that other parts and objects of the SR emulation come into view. In one embodiment, the SR emulation presents a three-dimensional environment to the user.

In another embodiment, the SR emulation also includes sound, for example, from the speaker 114. In another embodiment, the SR emulation includes other input to senses of the user, such as vibrations, motion, etc. In some embodiments, the SR emulation allows interaction by the user that is more than the user rotating the SR viewer 106. For example, the user may press buttons, move a joystick, pull a trigger, etc. on the controller 108 to alter the SR simulation. The SR simulation may be a game and the user may interact with objects in the SR emulation by shooting at objects, controlling a vehicle, such as an aircraft, spacecraft, etc., moving simulated body parts, and the like.

In one embodiment, the user interacts with the SR emulation by moving one or more body parts. For example, the controller 108 may include one or more sensors that detect movement of the user and the SR emulation may depict movement linked to movement of the user. The SR emulation may emulate true-to-life circumstances, for example, a flight simulator, or may emulate fictitious scenarios, such as animated characters in a fantasy environment, computer-generated imagery, and the like. An SR emulation, as used herein, includes emulations as well as simulations and may include any environment where a visual indicator from an object out of field of view of the user may be helpful.

In one embodiment, the SR viewer 106 is a headset that surrounds one or both eyes of a user. In the embodiment, the user may rotate the SR viewer 106 so that other parts of the SR emulation come into view. The SR viewer 106 and/or the SR device 104 assume a position of the user with respect to the SR viewer 106. For example, where the SR viewer 106 is to be worn over the eyes of the user, the SR viewer 106/SR device 104 may assume that a center of the user's head is in a particular position with respect to the SR viewer 106. Where the SR viewer 106 includes one or more screens, the SR viewer 106/SR device 104 may assume that the user is in a particular position with respect to the screen(s).

For example, the SR viewer 106 may be part of a flight simulator with screens on windows of a cockpit where the user sits in the cockpit. The simulator may move to simulate flight. The SR viewer 106 and/or the system 100 may include one or more sensors that determine movement and rotation of the SR viewer 106. In another embodiment, the SR viewer 106 includes one or more screens surrounding the user or the head of the user where the user's head may rotate to view other parts of the SR emulation. One of skill in the art will recognize other SR emulations and other forms of an SR viewer 106.

The system 100 includes a controller 108 that receives input from the user of the SR viewer 106 or from another person. In one embodiment, the controller 108 is a game controller. The game controller may be handheld, may be connected to one or more body parts of the user, may include controls on a console or any other form that allows a user or another person to control the SR emulation. The controller 108 may include sensors, keys, buttons, joysticks, a trigger, or other user input device. The controller 108 may include a processor or may be constructed of hardware circuits or a programmable hardware device. In one embodiment, the controller 108 is a single device. In another embodiment, the controller 108 may include multiple devices, such as various sensors in addition to a handheld device. One of skill in the art will recognize other forms of a controller 108.

The system 100 includes a server 110 connected to the SR device 104 over a computer network 112. The connection between the SR device 104 and the server 110 may be a wireless connection as described above or may be a physical connection (i.e. wired connection) that may include cables, fiber optics, or the like. The server 110, in one embodiment, includes one or more parts of the visual indicator apparatus 102. In another embodiment, the server 110 provides data storage, supporting calculations, or some other function useful to the SR device 104. In another embodiment, the visual indicator apparatus 102 is on the server 110. For example, an embodiment of the system 100 may not include the SR device 104 and the SR viewer 106, the controller 118, the speaker 114, etc. may connect directly to the server 110. In another embodiment, the server 110 is owned by a party that provides the SR emulation and sends software updates, data, etc. to the SR device 104, the SR viewer 106, and/or the controller 108. In another embodiment, the server 110 facilitates connection by other users for a multi-party SR emulation.

The server 110 may include rack mounted equipment in a data center, a rack mounted computer, a desktop computer, a workstation, a mainframe computer, a laptop computer, and the like. The server 110 may connect to other servers, to a storage area network, etc. One of skill in the art will recognize other forms and functions of a server 110 connected to the SR device 104.

The system 100, in one embodiment, includes a computer network 112. The computer network 112 is connected to the SR device 104, and possibly to other equipment, such as the SR viewer 106, the controller 108, other servers, a storage area network, etc. The computer network 112, in one embodiment, includes a digital communication network that transmits digital communications. The computer network 112 may include a wireless network, such as a wireless cellular network, a local wireless network, such as a Wi-Fi network, a Bluetooth® network, a near-field communication ("NFC") network, an ad hoc network, and/or the like. The computer network 112 may include a wide area network ("WAN"), a storage area network ("SAN"), a local area network ("LAN"), an optical fiber network, the internet, or other digital communication network. The computer network 112 may include two or more networks.

The computer network 112 may include one or more servers, routers, switches, and/or other networking equipment. The computer network 112 may also include one or more computer readable storage media, such as a hard disk drive, an optical drive, non-volatile memory, RAM, or the like. The computer network 112 may also include one or more wireless connections as described above. While a single computer network 112 is depicted in FIG. 1, the system 100 may include multiple computer networks 112, which may be independent or may interact.

The system 100, in some embodiments, includes one or more speakers 114 that generate sound for the SR emulation. For example, the speakers 114 may be in the form of headphones that go in the ears of the user. In another embodiment, the speakers 114 may be in a room where the user is located. The sounds may be part of the SR emulation and may also include sounds associated with visual indicators, as explained below.

Figure 2:
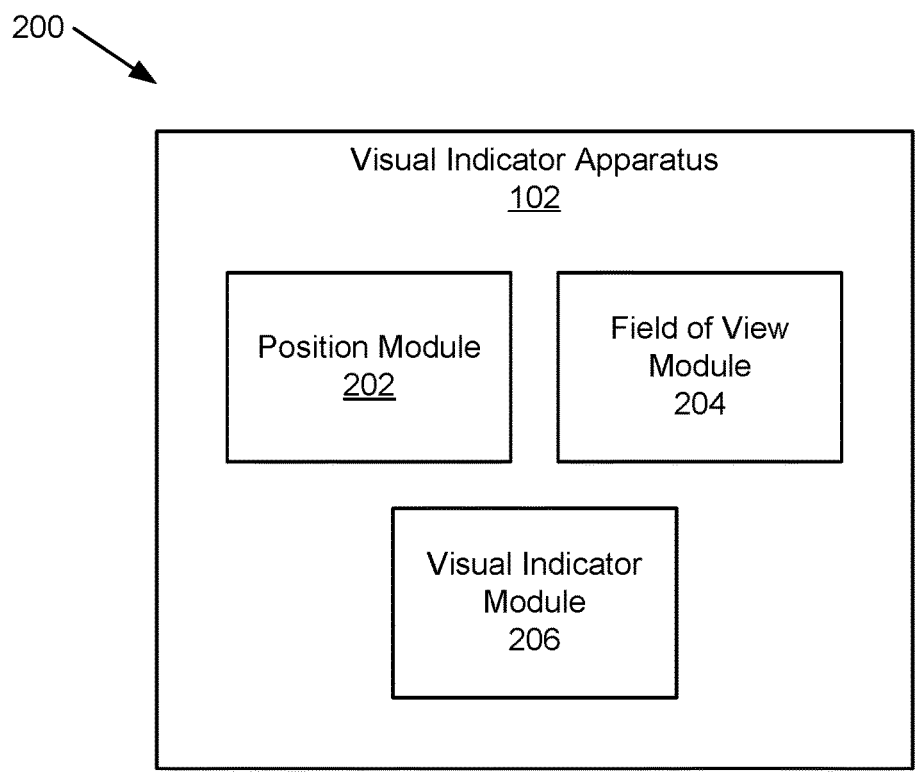
FIG. 2 is a schematic block diagram illustrating one embodiment of an apparatus for SR object location.

FIG. 2 is a schematic block diagram illustrating one embodiment of an apparatus 200 for SR object location. The apparatus 200 includes one embodiment, of a visual indicator apparatus 102 with a position module 202, a field of view ("FOV") module 204 and a visual indicator module 206, which are described below.

The apparatus 200 includes a position module 202 that determines a position of an object in an SR emulation with respect to a position of a user. As used herein, "position" includes a location of an object or the user and may also include a specified direction or orientation. For example, a user's position may include a location of the user and also the orientation of the user with respect to the SR viewer 106 and/or the object. The SR emulation is viewable by the user with an SR viewer 106 and the SR viewer 106 has a limited field of view of the SR emulation. In one embodiment, the limited field of view is due to limitations of the SR viewer 106. For example, the SR viewer 106 may display less than a 360-degree view and may have a limited view vertically. In another embodiment, the limited field of view is due to limitations of vision of the user.

The object with respect to the user, as used herein, includes an emulated position of the object with respect to an assumed position of the user with respect to the SR viewer 106 in the SR emulation where the object may not be displayed because the object is out of view of the user, but would be visible if the user rotated the user's head and/or SR viewer 106 so that the object comes within the field of view of the SR viewer 106. Rotation of the user's head may be actual movement where the user moves the SR viewer 106 or the user's head with respect to the SR viewer 106, or may be virtual where the user provides input to the controller 118 to simulate rotation of the head of the user.

Position of the user, as used herein, is an assumed position based on shape and geometry of the SR viewer 106. The position of the object with respect to the user may include a distance between the object and the user, an elevation of the object, and an angle between the object and the field of view of the SR viewer 106 or a point in a coordinate system. For example, a reference point in the field of view of the SR viewer 106 may be used as zero degrees with the user at an origin and the object may be 120 degrees clockwise from the reference point. In another example, the SR emulation may include a coordinate system where the SR viewer 106 may rotate with respect to the coordinate system and the object may be at a particular angle from a zero-degree angle within the coordinate system.

The position of the object with respect to the user may include a vertical dimension. For example, the SR emulation may include objects in an emulation of a sky or, where the SR emulation is from the perspective of an aircraft or spacecraft, the object may be above or below a horizontal plane of the user and/or SR viewer 106. The position of the object with respect to the user is position perceived by the user based on size of the object when in view. For example, a large size of the object represents a closer position than a smaller size of the object. The position module 202 may keep track of the user with respect to the object or may determine position based on information from the SR device 104 that is keeping track of objects in the SR emulation with respect to the position of the user.

In one embodiment, the SR emulation includes objects that are within a limit. For example, objects beyond the limit may be deemed too far away to be displayed or to be candidates for the visual indicator apparatus 102. Objects that are close enough to come into view of the SR viewer 106 where within the field of view of the SR viewer 106 may be those that are within this limit and may emit a visual indicator, as described below. The position module 202 may determine a position of an object with respect to the user for objects within a position limit, which may be at a boundary where the object is viewable or the limit may be less than the viewable boundary.

The apparatus 200 includes a field of view module 204 that determines a position of the field of view of the SR viewer 106 with respect to the object. In one embodiment, the field of view module 204 determines a size of the field of view of the SR viewer 106 from the perspective of a user. For example, the field of view module 204 may determine an angle either side of a center point or center plane in the field of view that is viewable for the user. For example, from a center point or center plane within the field of view of the viewer, the field of view may be 30 degrees either side of this center point or center plane. The size of the field of view may include a horizontal amount, a vertical amount, etc. and may include edges of the field of view that are rectangular, spherical, or other shape.

The field of view module 204 may also determine a current position of the SR viewer 106. For example, where the user is assumed to be at an origin, the field of view module 204 may determine a current horizontal position and/or a vertical position of the SR viewer 106. From the determination of the size of the field of view and a current position of the SR viewer 106 with respect to the object. The field of view module 204 may also determine if the object is within the field of view of the SR viewer 106.

In an embodiment where the user's head moves with respect to the SR viewer 106 and the SR viewer 106 includes a screen, the field of view module 204 may determine the size of the field of view to be that of what a typical person can view and the field of view module 204 may track head position of the user in the SR viewer 106 to determine if the object is within the field of view.

The apparatus 200 includes a visual indicator module 206 that emits a visual indicator from a position of the object and in a direction of the user. The visual indicator is visible or becomes visible in the field of view of the SR viewer 106 and the visual indicator within the field of view includes an indication of the position of the object with respect to the user. The visual indicator indicates visually to the user the position of the object so that the user is aware of the object.

In one embodiment, the visual indicator includes a simulated waveform that moves from the position of the object through the field of view. The waveform provides an indication of a distance between the object and the user and/or a relative position with respect to the field of view of the SR viewer 106. For example, the visual indicator may be similar to a wave emanating from a disturbance in a liquid or gas. The visual indicator may take the form of one or more wavefronts that emanate in expanding spheres or a portion of a sphere (e.g. a circle), from the position of the object. A center of the spherical wavefronts may be the position of the object with respect to the position of the user. The shape of the wavefronts as they pass through the field of view may then indicate a position of the object where the user can deduce the position of the object based on the shape of the wavefronts and/or the direction of travel of the wavefronts. The visual indicator module 206 may display a portion of the spherical waveform. For example, the visual indicator module 206 may display ripples in a ground in the SR emulation, concentric circles, etc.

The user may view the angle of the wavefronts to determine a position of the object. For example, a wavefront that travels from right to left through the field of view may indicate that the object is to the right of the user. Where the wavefronts move from right rear to left front, the user may deduce that the object is to the right and behind the user. The angle of the wavefronts moving through the field of view also may denote position of the object, as is explained further in the examples of FIGS. 4 and 5.

In one embodiment, a thickness of a wavefront relates to the distance between the object and the user. For example, a wavefront may expand in thickness as it travels from the position of the object, for example, emulating a lower amplitude that is spread out more as the wavefront energy is lost as the wavefront travels away from the position of the object. In another example, a wavefront may become thinner as it travels from the position of the object. Where the wavefronts are stationary, wavefronts further from the position of the object may be thicker than those closer to the object. In another embodiment, wavefronts further from the position of the object may be thinner than those closer to the object.

In one embodiment, the waveform includes at least a portion of two or more spherical wavefronts visible in the field of view where a space between wavefronts relates to the distance between the object and the user. For example, the wavefronts visible in the field of view may be portions of concentric circles where the distance between circles is related to distance to the object. In one embodiment, a smaller distance between concentric circles signifies that the object is closer than a larger distance between concentric circles.

In another embodiment, an intensity of a wavefront relates to the distance between the object and the user. For example, the wavefront may appear as a distortion in the SR emulation so that a higher amount of distortion may indicate that the object is closer than a lower amount of distortion where the object is further away from the user.

The visual indicator emitted by the visual indicator module 206 may be of various forms. For example, the visual indicator may appear as a distortion in the SR emulation. A waveform may appear in the field of view as a distortion. In another example, the visual indicator includes a change in visibility in the field of view. For instance, the visual indicator may lighten or darken portions of the field of view. In another example, the change in visibility may include what appears to be smoke rings emanating from the position of the object.

Where the visual indicator is a waveform, wavefronts may appear as expanding circles of lighter or darker rings. In another embodiment, the visual indicator may change color in the field of view. For example, where the visual indicator is a waveform, a wavefront may include a change of color in the field of view. For instance, a wavefront from one object or a certain class of objects may be red while a wavefront from another object or another class of objects may be blue. One of skill in the art will recognize other forms of a visual indicator.

In one embodiment, the visual indicator module 206 emits visual indicators on a continual basis from the position of the object. In another embodiment, the visual indicator module 206 emits visual indicators periodically, the visual indicators may be separate or may be a burst of several visual indicators. In another embodiment, the visual indicator module 206 emits a single visual indicator until conditions change, such as change of position of the object, user and/or field of view.

In one embodiment, the visual indicator module 206 emits one or more visual indicators on top of a pre-recorded SR emulation. For example, the SR emulation may be a nature walk experience played for the user without the user controlling much of the SR emulation. In another embodiment, the SR emulation is interactive and the visual indicator module 206 is part of the interactive experience of the user where the user may provide input and the SR emulation dynamically changes based on the user input.

In one embodiment, the simulated reality emulation is a virtual reality ("VR") emulation, where the VR emulation is viewable by the user with a VR viewer and the VR viewer has a limited field of view of the VR emulation. In the embodiment, the object and surroundings are simulated. The embodiment includes VR video games, VR simulators, and the like. The embodiment does not include augmented reality, mixed reality, etc. and does not include a view or partial view of the physical surroundings of the user.

Figure 3:
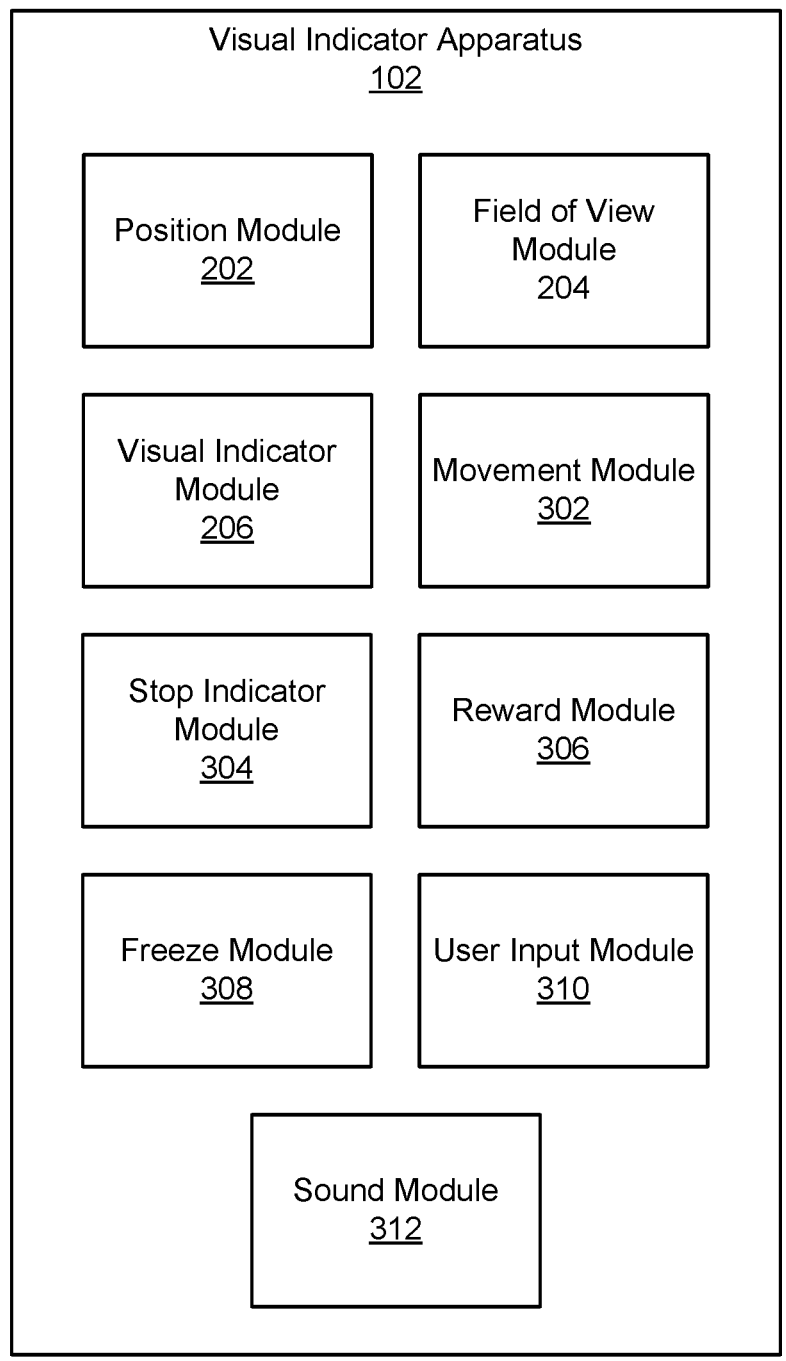
FIG. 3 is a schematic block diagram illustrating one embodiment of another embodiment of an apparatus for SR object location.

FIG. 3 is a schematic block diagram illustrating one embodiment of another embodiment of an apparatus 300 for SR object location. The apparatus 300 includes another embodiment of a visual indicator apparatus 102 with a position module 202, a field of view module 204 and a visual indicator module 206, which are substantially similar to those described above in relation to the apparatus 200 of FIG. 2. The apparatus 300, in some embodiments, includes a movement module 302, a stop indicator module 304, a reward module 306, a freeze module 308, a user input module 310 and/or a sound module 312, which are described below.

The apparatus 300 includes, in some embodiments, a movement module 302 that detects movement of the object and/or the user with respect to the SR emulation and detects movement of the field of view of the SR viewer 106 and emits one or more additional visual indicators. Each additional visual indicator is based on a current position of the object with respect to a current position of the user in the SR emulation at a time when the visual indicator is emitted and/or a current position of the field of view in the SR emulation with respect to the object at the time when the visual indicator reaches the field of view.

For example, the visual indicator module 206 may emit a visual indicator while the object and user are in a first position. The movement module 302 may then detect movement of the object, the user and/or the field of view and the movement module 302 may then cause the visual indicator module 206 to emit a visual indicator based on the new positioning of the object, the user and/or the field of view. Where the object moves, the movement module 302 may cause the visual indicator module 206 to emit a visual indicator from the new position of the object.

Where the user moves, in one embodiment, the movement module 302 causes the visual indicator module 206 to emit another visual indicator based on the new positioning of the user so that the visual indicator appears in the field of view of the SR viewer 106 based on the new position of the user. Where the visual indicator is a spherical or circular wavefront (moving or stationary), the visual indicator module 206 may not need to adjust the visual indicator because of the shape of the visual indicator. In another embodiment, for example where the visual indicator is a shape other than a circular or spherical wavefront or where the visual indicator is direction al and/or only directed to the field of view, the visual indicator module 206 may adjust the visual indicator commanded by the movement module 302 based on the new position of the user. In another embodiment where the field of view moves, the visual indicator module 206 may adjust the visual indicator for the new position of the field of view as well as for a new position of the object and/or user if the object or user has moved.

Figure 4:
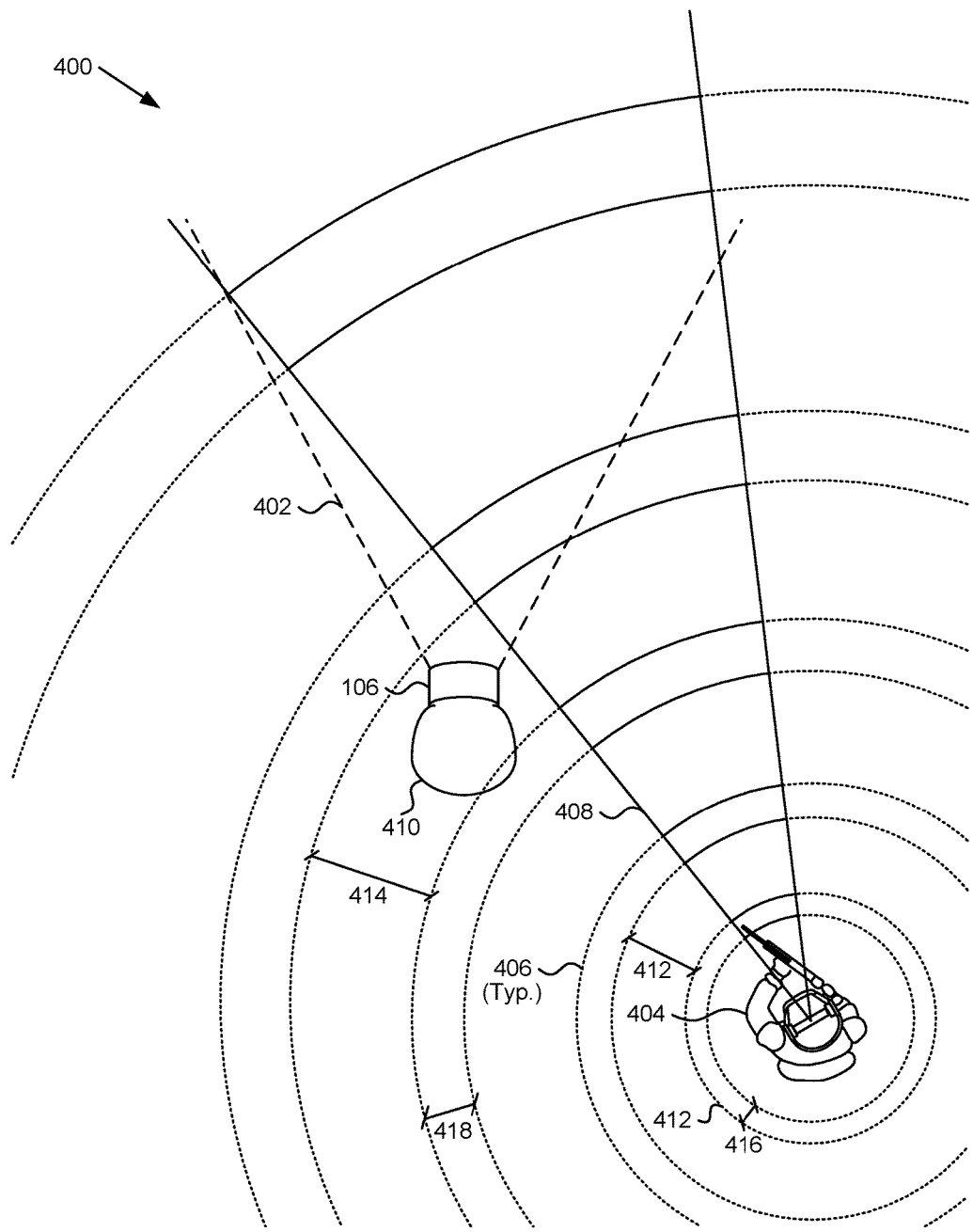
FIG. 4 is a schematic block diagram illustrating one embodiment of an SR viewer, a field of view of the SR viewer, an object and visual indicators.

FIG. 4 is a schematic block diagram 400 illustrating one embodiment of an SR viewer 106, a field of view 402 of the SR viewer 106, an object 404 and visual indicators 406. The SR viewer 106 is depicted with a field of view 402 beyond the SR viewer 106. However, the actual field of view only appears to extend beyond the SR viewer 106 and the diagram 400 merely represents an overhead perspective of a perceived view by the user. The overhead view is for convenience of demonstrating the visual indicators 406, the object 404, etc. The user is not shown, but typically would be wearing the SR viewer 106 with a head strap 410 connected to the SR viewer 106 around the head of the user.

The object 404 is depicted as a uniformed shooter which may be typical in an SR game. The visual indicators 406 in the depicted embodiment are waveforms that emanate from the position of the object 404 and are depicted as wavefronts. Each wavefront is depicted as two circular rings. In the depicted embodiment, the visual indicators 406 are rings where a space 412 between sets of rings closer to the object 404 are closer together than a space 414 between sets of rings further from the position of the object 404. In addition, for a set of rings close to the object 404, the space 416 between rings is smaller than the space 418 between rings for a set of rings further from the position of the object 404. The user may then be able to view the spacing (e.g. 412, 414) between visual indicators 406 and/or the spacing (e.g. 416, 418) between rings to determine a distance to the object 404. Other embodiments may have a different mechanism for determining distance to the object 404, such as visual intensity, color, size, etc. of a visual indicator 406. Other embodiments may also include a single ring as a wavefront instead of a pair of rings.

In the depicted embodiment, portions (e.g. 408) of the visual indicators 406 that will pass through the field of view 402 are depicted as solid lines while other portions of the visual indicators 406 are dashed to depict visual indicators 406 that are only part of a circular waveform. The visual indicator module 206, in the embodiment, may generate a partial waveform either in the field of view or headed toward the field of view and other parts of the waveforms of the visual indicators 406 are not generated. Generation of partial waveforms may be less computationally intensive in certain circumstances than generation of full circular and/or spherical waveforms.

Other scenarios where generation of full waveforms is less computationally intensive may dictate use of full waveforms. Note that the visual indicators 406 are visible only in the SR viewer 106 and generation of the visual indicators as depicted in FIG. 4 is for convenience. In some scenarios, the visual indicator module 206 generates visual indicators 406 in a plan view environment and the SR device 104 and/or visual indicator module 206 translates the visual indicators 406 to be viewed in the SR emulation visible in the SR viewer 106.

Figure 5:
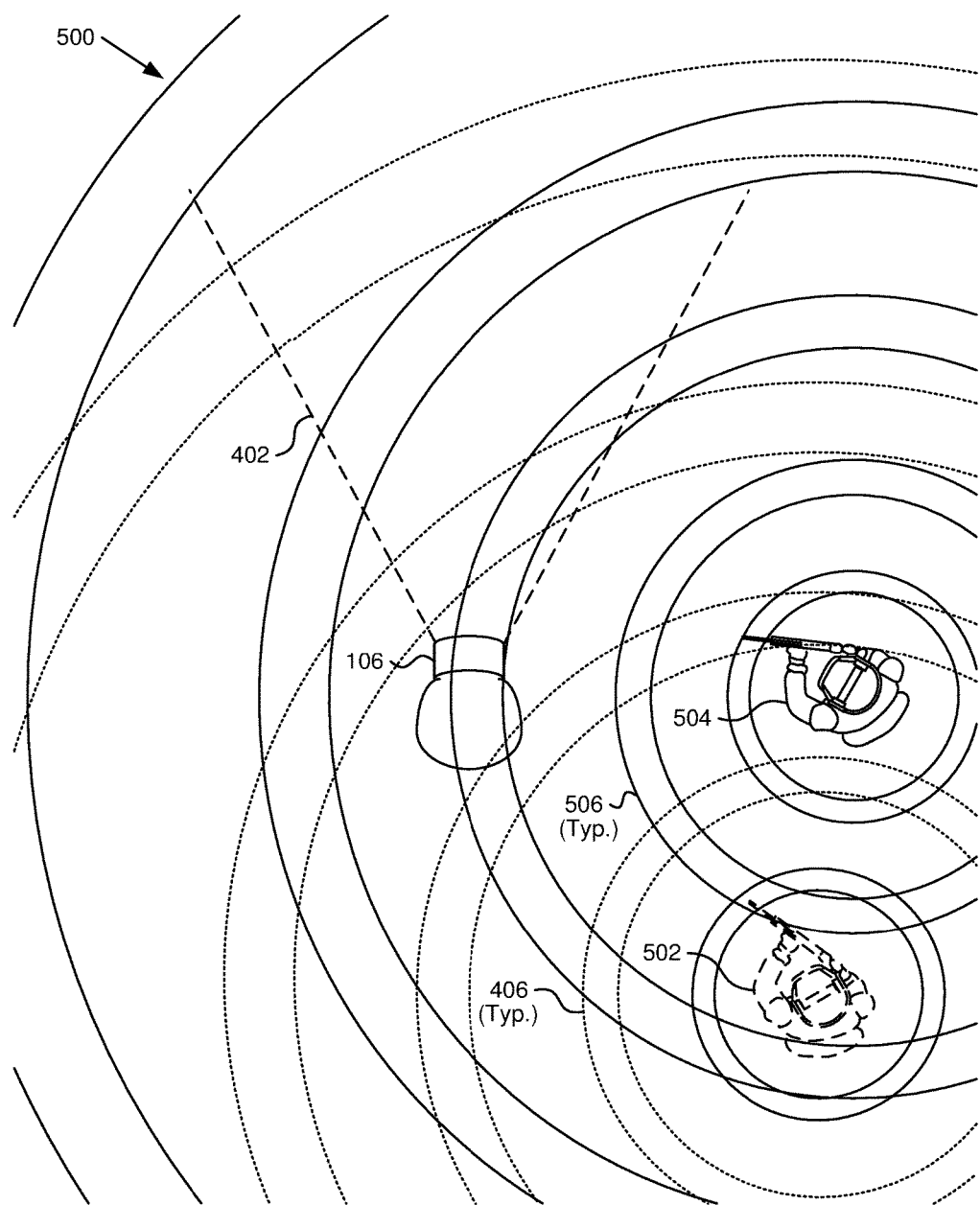
FIG. 5 is a schematic block diagram illustrating one embodiment of an SR viewer, a field of view of the SR viewer, an object's first position and second position and visual indicators.

FIG. 5 is a schematic block diagram 500 illustrating one embodiment of an SR viewer 106, a field of view 402 of the SR viewer 106, an object's first position 502 and second position 504 and visual indicators 406, 506. The diagram 500 depicts movement of the object 404 from a first position 502 to a second position 504. The SR viewer 106, field of view 402, initial position 502 of the object 404, and visual indicators 408 are the same as the diagram 400 of FIG. 4 except that the visual indicators 406 are depicted as dashed lines to distinguish from visual indicators 506 from the object 404 in the second position 504.

Visual indicators from where the object 404 is in the second position 504 are depicted as solid lines. Note that the second visual indicators 506 in the field of view 402 from the second position 504 are angled differently from the first visual indicators 406 in the field of view 402 from the first position 502. In one embodiment, the movement module 302 detects movement of the object 404 from the first position 502 to the second position 504 and causes the visual indicator module 206 to emit a visual indicator from the second position 504 of the object 404, as depicted in FIG. 5.

The movement module 302 may detect movement of the object 404, the user or the SR viewer 106 and may then control timing of emission of the visual indicators 406, 506. For example, the movement module 302 may cause the visual indicator module 206 to emit visual indicators 406, 506 every second, every half second, every two seconds, etc. In addition, the movement module 302 may detect movement of the object 404, the user and/or the SR viewer 106 and may act to cause the visual indicator module 206 to change emission of visual indicators (e.g. 506) when the detected movement is beyond a threshold.

The apparatus 300 includes, in some embodiments, a stop indicator module 304 that stops emission of visual indicators (e.g. 406) in response to the field of view module 204 determining that the object 404 is in the field of view 402 of the SR viewer 106. For example, a user may not want the visual indicators 406 when the object 404 is in the field of view 402. Emission of visual indicators 406 while the object 404 is in the field of view 402 may be distracting to the user. In one embodiment, the stop indicator module 304 stops emission of new visual indicators. In another embodiment, the stop indicator module 304 stops emission of visual indicators by stopping display of previously emitted visual indicators. In another embodiment, the user may control the stop indicator module 304 to stop emission of the visual indicators in the field of view 402 or to allow visual indicators in the field of view 402.

In some embodiments, the SR emulation is a game and the apparatus 300 includes a reward module 306 that allows the visual indicator module 206 to emit visual indicators as a reward in the game. For example, the visual indicators may warn a user of an approaching enemy, may indicate a target, may indicate the presence of another user, etc. The user may earn rewards by exceeding a point value, by capturing an object, by entering a room, etc. and a reward may be for the visual indicator module 206 to emit one or more visual indicators from one or more objects, from one or more classes of objects, etc. One of skill in the art will recognize ways to enable emission of visual indicators from the position of one or more objects as a reward.

The apparatus 300, in certain embodiments, includes a freeze module 308 that freezes a position of a visual indicator in response to movement of the user. For example, when the user is moving, either by changing position or rotating the field of view 402, having moving visual indicators may add complexity to the user identifying the position of the object 404. Freezing the visual indicators while the user moves may allow a user to more easily identify the position of the object 404. The freeze module 308, in one embodiment, stops movement of visual indicators that move away from the position of the object 404. In another embodiment, the freeze module 308 stops movement of visual indicators that move away from the position of the object 404, but allows visual indicators in the field of view 402 to rotate as the object 404 moves.

The apparatus 300, in some embodiments, includes a user input module 310 that receives input from the user, for example, through the controller 118. The input, for example, allows the user to control emission of the visual indicators. For instance, the user may enable and disable the visual indicators. In another embodiment, the user input module 310 allows the user to change colors of the visual indicators, allows the user to change the type of visual indicators, allows the user to select which objects can have associated visual indicators, etc. One of skill in the art will recognize other ways for the user input module 310 to receive input from the user that controls emission of visual indicators.

In some embodiments, the apparatus 300 includes a sound module 312 that emits a sound indicator. Each sound indicator, in one embodiment, is synchronized to a visual indicator. In another embodiment, each sound indicator simulates being emitted from the position of the object. For example, the speakers 114 of FIG. 1 may be headphones that are part of the SR viewer 106 and may produce sounds for the user. In another embodiment, the system 100 includes speakers 114 located in a room, chamber, or other position where the user can hear the sound indicators. The sound indicators may be synchronized with the visual indicators passing through the field of view 402. In one embodiment, the sound module 312 generates sound indicators associated with the visual indicators that are stereo and indicate a direction of emanation. In other embodiments, the sound module 312 uses the Doppler Effect to increase or decrease a pitch of sound indicators indicative of the visual indicators approaching and passing or the object 404 becoming closer or farther away from the user. One of skill in the art will recognize other ways that the sound module 312 can generate sound indicators that further indicate a position of the object 404 with respect to the user.

Figure 6:
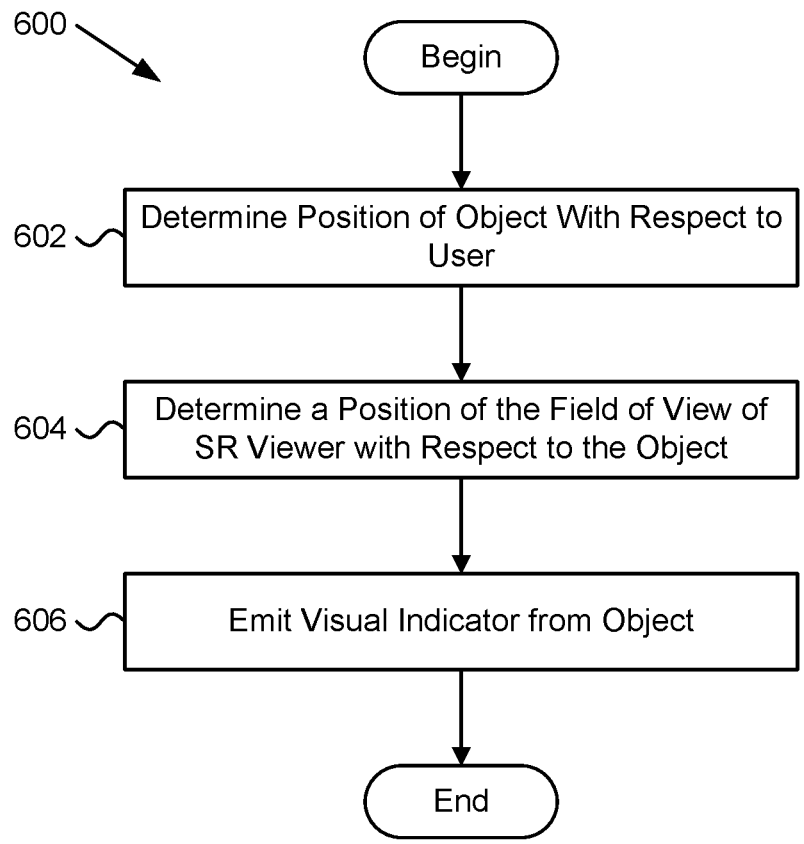
FIG. 6 is a schematic flow chart diagram illustrating one embodiment of a method for SR object location.

FIG. 6 is a schematic flow chart diagram illustrating one embodiment of a method 600 for SR object location. The method 600 begins and determines 602 a position of an object in an SR emulation with respect to a position of a user. The SR emulation is viewable by a user with an SR viewer 106 and the SR viewer 106 has a limited field of view 402 of the SR emulation. The method 600 determines 604 a position of the field of view 402 of the SR viewer 106 with respect to the object 404. The method 600 emits 606 a visual indicator from a direction of the object 404 and in a direction of the user, and the method 600 ends. The visual indicator is visible in the field of view 402 of the SR viewer 106. The visual indicator within the field of view 402 includes an indication of the position of the object 404 with respect to the user. In some embodiments, the position module 202, the field of view module 204 and/or the visual indicator module 206 perform one or more of the steps of the method 600.

Figure 7:
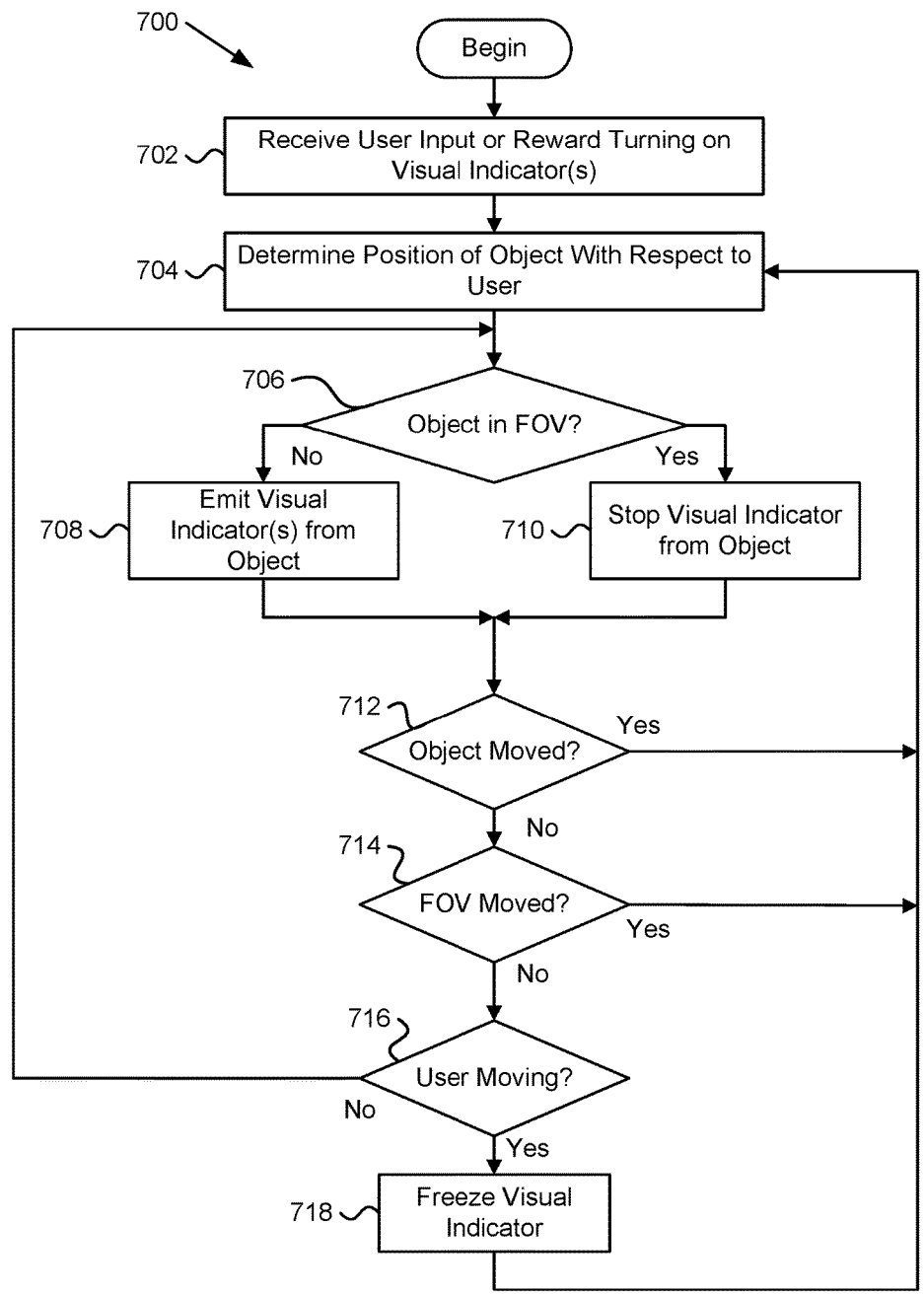
FIG. 7 is a schematic flow chart diagram illustrating one embodiment of another method for SR object location.

FIG. 7 is a schematic flow chart diagram illustrating one embodiment of another method 700 for SR object location. The method 700 begins and receives 702 user input or a reward that turns on emission of visual indicators. The method 700 determines 704 a position of an object 404 in an SR emulation with respect to a position of a user. The SR emulation is viewable by a user with an SR viewer 106 and the SR viewer 106 has a limited field of view 402 of the SR emulation.

The method 700 determines 706 if the object 404 is in the field of view 402 of the SR viewer 106. If the method 700 determines 706 that the object 404 is not in the field of view 402 of the SR viewer 106, the method 700 emits one or more visual indicators from a position of the object 404. If the method 700 determines 706 that the object 404 is in the field of view 402 of the SR viewer 106, the method 700 stops 710 emission of visual indicators.

The method 700 determines 712 if the object 404 has moved, determines 714 if the field of view 402 has moved, and determines 716 if the user is moving. If the method 700 determines 712 that object 404 has not moved, determines 714 that the field of view 402 has not moved and determines 716 that the user has not moved, the method 700 returns and continues to emit 708 the visual indicator where the object 404 is not in the field of view 402 or continues to not emit the visual indicator if the object 404 is not in the field of view 402.

If the method 700 determines 712 that the object has moved or determines 714 that the field of view has moved, the method 700 returns to determine 704 the position of the object 404 with respect to the user. If the method 700 determines 716 that the user is moving, the method 700 freezes 718 the visual indicator in the field of view 402 and returns to determine 704 the position of the object 404 with respect to the user. In some embodiments, the position module 202, the field of view module 204, the visual indicator module 206, the movement module 302, the stop indicator module 304 the reward module 306, the freeze module 308 and/or the user input module 310 perform one or more of the steps of the method 700.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
determine a position of an object in a simulated reality ("SR") emulation with respect to a position of a user, the SR emulation viewable by the user with an SR viewer, the SR viewer comprising a limited field of view of the SR emulation;
determine a position of the field of view of the SR viewer with respect to the object; and
emit a visual indicator from a direction of the object and in a direction of the user, the visual indicator visible in the field of view of the SR viewer, the visual indicator within the field of view comprising an indication of the position of the object with respect to the user,
wherein the visual indicator comprises a simulated waveform that moves from the position of the object through the field of view, the waveform providing an indication of one or more of a distance between the object and the user and a relative position with respect to the field of view of the SR viewer, the waveform comprising at least a portion of one or more spherical wavefronts visible in the field of view, wherein a center of the spherical wavefronts comprises the position of the object with respect to the position of the user.

2. The apparatus of claim 1, wherein the waveform comprises at least a portion of two or more spherical wavefronts visible in the field of view wherein a space between wavefronts relates to the distance between the object and the user.

3. The apparatus of claim 1, wherein a thickness of a wavefront relates to the distance between the object and the user.

4. The apparatus of claim 1, wherein an intensity of a wavefront relates to the distance between the object and the user.

5. The apparatus of claim 1, wherein each visual indicator comprises one or more of:
   a distortion of the field of view of the SR viewer;
   a change in visibility in the field of view of the SR emulation; and
   a color change of the field of view of the SR viewer.

6. The apparatus of claim 1, wherein the memory further comprises code executable by the processor to:
   detect one or more of:
      movement of one or more of the object and the user with respect to the SR emulation; and
      movement of the field of view of the SR viewer; and
   emit one or more additional visual indicators, wherein each additional visual indicator is based on one or more of:
      a current position of the object with respect to a current position of the user in the SR emulation at a time when the visual indicator is emitted; and
      a current position of the field of view in the SR emulation with respect to the object at the time when the visual indicator reaches the field of view.

7. The apparatus of claim 1, wherein the memory further comprises code executable by the processor to stop emitting visual indicators in response to the object being in the field of view of the SR viewer.

8. The apparatus of claim 1, wherein the memory further comprises code executable by the processor to emit a sound indicator, each sound indicator synchronized to a visual indicator, each sound indicator simulating being emitted from the position of the object.

9. The apparatus of claim 1, wherein the SR emulation comprises a game, and wherein the memory further comprises code executable by the processor to emit the visual indicator as a reward in the game.

10. The apparatus of claim 1, wherein the memory further comprises code executable by the processor to freeze a position of a visual indicator in response to movement of the user.

11. The apparatus of claim 1, wherein the memory further comprises code executable by the processor to receive input from the user, the input controlling emission of the visual indicator.

12. The apparatus of claim 1, wherein the simulated reality emulation is a virtual reality ("VR") emulation, wherein the VR emulation is viewable by the user with a VR viewer, the VR viewer comprising a limited field of view of the VR emulation.

13. A method comprising:
   determining a position of an object in a simulated reality ("SR") emulation with respect to a position of a user, the SR emulation viewable by a user with an SR viewer, the SR viewer comprising a limited field of view of the SR emulation;
   determining a position of the field of view of the SR viewer with respect to the object; and
   emitting a visual indicator from a direction of the object and in a direction of the user, the visual indicator visible in the field of view of the SR viewer, the visual indicator within the field of view comprising an indication of the position of the object with respect to the user,
   wherein the visual indicator comprises a simulated waveform that moves from the position of the object through the field of view, the waveform providing an indication of one or more of a distance between the object and the user and an angle relative to a center of the field of view of the SR viewer, the waveform comprising at least a portion of one or more spherical wavefronts visible in the field of view, wherein a center of the spherical wavefronts comprises the position of the object with respect to the position of the user.

14. The method of claim 13, wherein one or more of:
   the waveform comprises at least a portion of two or more spherical wavefronts visible in the field of view wherein a space between wavefronts relates to the distance between the object and the user;
   a thickness of a wavefront relates to the distance between the object and the user; and
   an intensity of a wavefront relates to the distance between the object and the user.

15. The method of claim 13, wherein each waveform comprises one or more of:
   a distortion of the field of view of the SR viewer;
   a change in visibility in the field of view of the SR emulation; and
   a color change of the field of view of the SR viewer.

16. The method of claim 13, further comprising:
   detecting one or more of:
      movement of one or more of the object and the user with respect to the SR emulation; and
      movement the field of view of the SR viewer; and
   emitting one or more additional visual indicators, wherein each additional visual indicator is based on one or more of:
      a current position of the object with respect to a current position of the user in the SR emulation at a time when the visual indicator is emitted; and
      a current position of the field of view of the SR emulation with respect to the object at the time when the visual indicator reaches the field of view.

17. A system comprising:
   a simulated reality ("SR") viewer for viewing an SR emulation;
   a computing device coupled to the SR viewer, the computing device comprising memory that stores code executable by a processor of the computing device to:
      determine a position of an object in an SR emulation with respect to a position of a user, the SR viewer comprising a limited field of view of the SR emulation;
      determine a position of the field of view of the SR viewer with respect to the object; and
      emit a visual indicator from a direction of the object and in a direction of the user, the visual indicator visible in the field of view of the SR viewer, the visual indicator within the field of view comprising an indication of the position of the object with respect to the user,
   wherein the visual indicator comprises a simulated waveform that moves from the position of the object through the field of view, the waveform providing an indication of one or more of a distance between the object and the user and a relative position with respect to the field of view of the SR viewer, the waveform comprising at least a portion of one or more spherical wavefronts visible in the field of view, wherein a center of the spherical wavefronts comprises the position of the object with respect to the position of the user.

* * * * *